United States Patent [19]
Hoshino et al.

[11] Patent Number: 5,516,842
[45] Date of Patent: May 14, 1996

[54] POLYCARBONATE RESIN COMPOSITION AND MOLDED PRODUCT THEREOF

[75] Inventors: Mitsuru Hoshino; Takeo Ogihara, both of Fukushima; Yasuhiro Kadota; Kazuaki Maruyama, both of Tochigi, all of Japan

[73] Assignees: Kureha Kagaku Kogyo Kabushiki Kaisha, Osaka; Tsutsunaka Plastic Kogyo Kabushiki Kaisha, Osaka, both of Japan

[21] Appl. No.: 334,241

[22] Filed: Nov. 4, 1994

[30] Foreign Application Priority Data

Nov. 4, 1993 [JP] Japan .................... 5-297548

[51] Int. Cl.$^6$ .................... C08L 69/00; C08L 51/04; C08F 279/02
[52] U.S. Cl. .................... 525/67; 525/309; 525/310
[58] Field of Search .................... 525/67, 308, 309, 525/310

[56] References Cited

U.S. PATENT DOCUMENTS 4,713,420  12/1987  Henton .................... 525/67

FOREIGN PATENT DOCUMENTS 2259564  6/1974  Germany .................... 525/67
240352  10/1987  Japan .................... 525/67

Primary Examiner—David Buttner
Attorney, Agent, or Firm—Wenderoth, Lind & Ponack

[57] ABSTRACT

A polycarbonate resin composition is given as a mixture of (A) 97–50 wt. % of a polycarbonate resin, and (B) 3–50 wt. % of a graft copolymer. The graft copolymer is obtained by graft-polymerizing 50–95 wt. parts of a monomer selected from (b1) a monomer mixture comprising 60–90 wt. % of an aromatic vinyl monomer, 40–10 wt. % of a vinyl cyanide monomer, and 0–30 wt. % of a monomer copolymerizable with the monomers and (b2) an alkyl methacrylate having an alkyl group including 1–4 carbon atoms in the presence of a latex containing 5–50 wt. parts of a rubber polymer with respect to the total of the monomer and the rubber polymer as 100 wt. parts. The graft copolymer includes a graft-polymerized component having a weight-average molecular weight $50 \times 10^4$–$300 \times 10^4$. The polycarbonate resin composition shows a good extrudability and provides a sheet product which exhibits good thermoforming characteristics, such as suppressed drawdown and good deep drawability.

10 Claims, No Drawings

POLYCARBONATE RESIN COMPOSITION AND MOLDED PRODUCT THEREOF

FIELD OF THE INVENTION AND RELATED ART

The present invention relates to a polycarbonate resin composition and a molded product thereof. More particularly, the present invention relates to a polycarbonate resin composition comprising a polycarbonate resin and a graft copolymer including a rubber trunk polymer and having excellent mechanical properties and extrusion processability, and a polycarbonate resin molded therefrom, e.g., by extrusion, and having excellent mechanical properties, little anisotropy thereof, and also an excellent thermo-formability.

Because of excellent mechanical properties and thermal properties, polycarbonate has been formed into various shapes and widely used as housing materials for electrical and electronic appliances, OA appliances, various parts, etc., internal trim materials in vehicles and airplanes, other various building materials.

Polycarbonate resin is however still accompanied with problems requiring improvements in respects of processability and performance, such as inferior processability because of a large melt viscosity, a large thickness-dependence of impact resistance, and a large drawdown characteristic and a poor thermo-formability of a plate or sheet product. Accordingly, various proposals have been made in order to improve the processability and performances.

For example, there are known compositions comprising a polycarbonate resin and graft copolymers obtained by graft-polymerizing styrene, methyl methacrylate, acrylonitrile, etc., onto a butadiene-based rubber (as disclosed in Japanese Patent Publication (JP-B) 38-15225, JP-B39-71, Japanese Laid-Open Patent Application (JP-A) 57-195146, etc.). However, these compositions involve difficulties, such as inferiorities in thermal stability, extrusion processability, heat-resistance or weathering resistance.

There have been also proposed polycarbonate resin compositions to which graft copolymers obtained by graft-polymerizing styrene, methyl methacrylate, etc., onto an acrylate-based rubber (JP-A 57-34153, JP-A 56-143239, JP-A 4-279659). However, these resins are inferior in rigidity and heat resistance and is also insufficient in effect of improving the impact resistance.

There have been also proposed compositions comprising a polycarbonate resin and methyl methacrylate resin, acrylonitrile-styrene copolymer or ethylene-alkyl acrylate copolymer added thereto (JP-B 43-13384, JP-A 63-199752). These compositions are also insufficient in effect of improving the impact resistance.

There have been also proposed many compositions comprising three or more components including such graft copolymers or copolymers, other thermoplastic resin, etc., and polycarbonate resin.

For example, JP-A 60-166342 and JP-A 1-103657 have proposed the co-use of a graft copolymer including a diene rubber as the trunk component and modified polyethylene. Other examples may include: a composition including a mixture of polycarbonate and polybutylene terephthalate as a base material and a graft copolymer including a diene rubber trunk component added thereto so as to improve the thickness-dependence of impact resistance, and three-component compositions including a graft copolymer having an acrylic rubber trunk component showing good heat resistance and weathering resistance and also another copolymer so as to improve the impact resistance and the processability (JP-A 58-65747, JP-A 58-76450, JP-A 4-279659, JP-A 5-70659), a composition comprising three or more components including a polycarbonate resin as a base material combined with another thermoplastic resin so as to improve the impact strength as well as the thickness-dependence thereof (JP-A 59-166556, JP-A 59-161460, JP-A 1- 103658).

These compositions may provide improved impact resistance and heat resistance, and the compositions of JP-A 4-279659 and JP-A 5-70659 have exhibited an improved sheet extrudability. However, these compositions have not been fully improved in anisotropy of impact resistance and fabricability from a sheet product.

Thus, some compositions having melt-extrudability and also capable of providing a molded product having an excellent impact resistance have been disclosed, but there has not been obtained a composition capable of providing a sheet product showing little drawdown during thermoforming, excellent fabricability (heat-stretchability) and excellent mechanical performances including not only a merely improved impact resistance but also a smaller anisotropy thereof.

SUMMARY OF THE INVENTION

An object of the present invention is to provide a polycarbonate resin composition which is excellent in extrusion processability, is capable of providing a sheet product showing little drawdown and excellent thermoforming characteristics, such as deep drawability, and is capable of providing molded products showing excellent mechanical properties, particularly little anisotropy in impact resistance.

Another object of the present invention is to provide a molded product of such a polycarbonate resin composition.

As a result of extensive study in order to accomplish the above objects, we have discovered that the addition of a specifically constituted graft copolymer in a specific amount as a modifier to a polycarbonate resin provides a composition which shows excellent extrusion processability, is capable of providing a sheet product showing excellent thermoforming characteristics and is capable of providing a molded product showing excellent impact resistance, little anisotropy thereof, and excellent mechanical and thermal performances. The present invention is based on the knowledge.

More specifically, according to the present invention, there is provided a polycarbonate resin composition, comprising:

(A) 97–50 wt. % of a polycarbonate resin, and (B) 3–50 wt. % of a graft copolymer obtained by graft-polymerizing 50–95 wt. parts of a monomer selected from (b1) a monomer mixture comprising 60–90 wt. % of an aromatic vinyl monomer, 40–10 wt. % of a vinyl cyanide monomer, and 0–30 wt. % of a monomer copolymerizable with the monomers and (b2) an alkyl methacrylate having an alkyl group including 1–4 carbon atoms, in the presence of a latex containing 5–50 wt. parts of a rubber polymer with respect to the total of the monomer and the rubber polymer as 100 wt. parts, the graft copolymer including a graft-polymerized component having a weight-average molecular weight of $50 \times 10^4$–$300 \times 10^4$.

According to anther aspect of the present invention, there is also provided a molded product of such a polycarbonate resin composition.

The above mentioned and other objects and features of the invention will be better understood upon consideration of the following detailed description concluding with specific examples.

DETAILED DESCRIPTION OF THE INVENTION

First of all, the polycarbonate resin (A) constituting a principal component of the composition and the molded product may be any polycarbonate resin as far as it is applicable to a molding method, such as injection molding, extrusion or blowing, and may generally comprise a polymer containing carbonate ester bonds in its main chain as obtained by reaction between an aromatic dihydroxy compound and a carbonate precursor, such as a carbonyl dihalide as represented by phosgene, a carbonyl diester as represented by diphenyl carbonate, or a mixture of these.

Examples of the aromatic dihydroxy compound may include: 2,2-bis(4-hydroxyphenyl)propane (i.e., bisphenol A), 2,2-bis(3-methyl-4-hydroxyphenyl)propane, 2,2-bis(3, 5-dimethyl-4-hydroxyphenyl)propane, 1,2-bis(4-hydroxyphenyl)ethane, 3,3-bis(4-hydroxyphenyl)pentane, 1,1-(4-hydroxyphenyl)cyclohexane, 4,4'-dihydroxybiphenyl, bis(4-hydroxyphenyl)sulfide, bis(4-hydroxyphenyl)sulfone, bis(4-hydroxyphenyl)sulfoxide, bis(4-hydroxyphenyl)ether, and 4,4'-dihydroxybenzophenone. Among these, bisphenol A is particularly preferred. These aromatic hydroxy compounds may be used singly or in mixture of two or more species thereof.

It is also possible to use a substituted aromatic dihydroxy compound having a substituent of a halogen or an alkyl group having 1–4 carbon atoms.

The polycarbonate resin used in the present invention can include a branched structure as formed by replacing a part of the aromatic dihydroxy compound with a polyfunctional aromatic compound having three or more hydroxy groups in its molecule for reaction with the carbonate precursor, or can be a polyester-polycarbonate copolymer containing an aliphatic ester bond segment in its main chain.

The polycarbonate resin used in the present invention may preferably have a molecular weight of $2.0 \times 10^4$–$3.5 \times 10^4$ further preferably $2.5 \times 10^4$–$3.0 \times 10^4$, in terms of a viscosity-average molecular weight calculated from an intrinsic viscosity as measured by using a methylene chloride solution at 20° C. If the viscosity-average molecular weight is below $2.0 \times 10^4$ the resultant sheet product is liable to cause a large drawdown during thermoforming to provide a poor thermoforming characteristic and also provide a lowered impact resistance of the sheet, thus failing to provide a practical molded product, even if the graft copolymer described hereinafter is added thereto. On the other hand, if the viscosity-average molecular weight exceeds $3.5 \times 10^4$ the composition is caused to have a high melt-viscosity and provide a large load during melt-extrusion thereof, thus showing an inferior processability.

Next, the graft copolymer (B) used in the present invention is obtained by graft-polymerizing (b1) a monomer mixture of an aromatic vinyl monomer, a vinyl cyanide monomer and an optional monomer copolymerizable with the monomers, or (b2) an alkyl methacrylate including a $C_1$–$C_4$ alkyl group, in the presence of an acrylic or diene-based rubber polymer, and the graft copolymer (B) is characterized by a specific weight-average molecular weight of the grafting component.

The acrylic rubber polymer may preferably be a polymer obtained by polymerizing at least 50 wt. % of an alkyl acrylate monomer having a $C_1$–$C12$ alkyl group, such as ethyl acrylate, butyl acrylate or 2-ethylhexyl acrylate and 0–50 wt. % of a vinyl monomer copolymerizable therewith by emulsion polymerization. The diene-based rubber polymer may preferably be a polymer obtained by polymerizing at least 50 wt. % of a conjugated diene monomer, such as butadiene or isoprene, and 0–50 wt. % of a vinyl monomer copolymerizable therewith, similarly by emulsion polymerization.

Examples of the vinyl monomer optionally copolymerized with the alkyl acrylate monomer or conjugated diene monomer may include the following.

For example, for the acrylic rubber, examples of the vinyl monomer may include: conjugated diene monomers; alkyl methacrylates having a $C_1$–$C_8$ alkyl group, such as methyl methacrylate and butyl methacrylate; $\alpha,\beta$-unsaturated carboxylic acids, such as acrylic acid and methacrylic acid; alkyl acrylates and alkyl methacrylates having an epoxy group; vinyl cyanides, such as acrylonitrile and methacrylonitrile; aromatic vinyl monomers, such as styrene and $\alpha$-methylstyrene; and vinylesters of $C_1$–$C_5$ aliphatic acids, such as vinyl acetate.

Further, for the diene rubber, examples of the copolymerizable vinyl monomer may include those copolymerizable monomers for the acrylic rubber except for the conjugated diene monomers, and alkyl acrylates having a $C_1$–$C12$ alkyl group.

In producing such a rubber polymer, it is possible to use a crosslinking monomer and/or a chain transfer agent, as desired. The crosslinking monomer may be used in an amount of at most 5 wt. %, preferably at most 3 wt. %, of the monomers constituting the rubber polymer.

Examples of the crosslinking monomer may include: aromatic polyfunctional vinyl compounds, such as divinylbenzene and divinyltoluene; dimethacrylates, such as ethylene glycol dimethacrylate and diethylene glycol dimethacrylate; diacrylates, such as ethylene glycol diacrylate and diethylene glycol diacrylate; allyl esters of unsaturated carboxylic acids, such as methacrylic acid, acrylic acid, fumaric acid, and maleic acid; and triallyl cyanurate.

The rubber polymer subjected to the graft-polymerization may be in the form of a latex containing rubber polymer particles having a diameter of preferably 50–500 nm. If the diameter is below 50 nm, it becomes difficult to obtain a graft copolymer having an excellent impact resistance. If large rubber particles in excess of 500 nm, the resultant polycarbonate resin composition is liable to have lower rigidity and thermal resistance.

As described above, the grafting monomer constituting the graft component of the graft copolymer used in the present invention may be (b1) a monomer mixture including an aromatic vinyl monomer and a vinyl cyanide monomer, examples of which may include those enumerated as constituents for the rubber polymer, and also an optional monomer copolymerizable therewith. Examples of the optional copolymer may include: alkyl acrylates and alkyl methacrylates each having a $C_1$–$C_8$ alkyl group, unsaturated carboxylic acids, and N-substituted maleimides, such as N-phenylmaleimide and N-alkylmaleimide. Alternatively, the grafting monomer may be (b2) one or a mixture of two or more species of alkyl methacrylates having a $C_1$–$C_4$ alkyl group. Among the grafting monomers, it is particularly preferred to use a monomer mixture comprising an aromatic vinyl monomer in a proportion of 60–90 wt. %, preferably 65–85 wt. %, and a vinyl cyanide monomer in a proportion of 40–10 wt. %, preferably 35–15 wt. %, or a monomer mixture obtained by adding to the monomer mixture an alkyl acrylate having a $C_1$–$C_4$ alkyl group in a proportion of 2–30 wt. %, preferably 3–15 wt. %, so as to provide a graft copolymer showing an enhanced mutual solubility with the polycarbonate resin, thereby providing the composition of the present invention with further enhanced mechanical properties.

The graft polymerization may be performed by polymerizing 50–95 wt. parts, preferably 60–93 wt. parts, of the grafting monomer as described above in the presence of 5–50 wt. parts, preferably 7–40 wt. parts, of the rubber polymer (with respect to the total of the grafting monomer and the rubber polymer as 100 wt. parts) by a known manner of emulsion polymerization. In the graft polymerization, it is preferred that an alkyl acrylate is post-added when the polymerization conversion of the monomer(s) in the grafting monomer (mixture) is in the range of 60–98%, more preferably 75–95%, to further continue the graft copolymerization, in order to provide a graft copolymer with little thermal coloration and excellent processability. Further, in order to provide the graft component having a relatively high molecular weight as will be described hereinafter, it is preferred to suppress the amount of the chain transfer agent or/and the initiator, or/and to increase the concentration of the grafting monomer.

The graft copolymer thus prepared and used in the present invention is characterized by the graft component having a specified molecular weight. More specifically, the graft component obtained by extraction from the graft copolymer with tetrahydrofuran solvent has a weight-average molecular weight of $50\times10^4$–$300\times10^4$ preferably $70\times10^4$–$300\times10^4$ further preferably $100\times10^4$–$300\times10^4$, as an essential requirement for producing a polycarbonate resin composition which is excellent in extrudability and provides a molded product having little anisotropy in mechanical properties, such as strength and having excellent thermoforming characteristic (fabricability).

If the weight-average molecular weight of the graft component is below $50\times10^4$ the mechanical properties are liable to be anisotropic and result in a molded product having a lowered practical performance, such as strength, and the improvement in extrudability or thermoforming characteristic is insufficient. Accordingly, it becomes impossible to accomplish the object of the present invention.

On the other hand, if the molecular weight of the graft component is as large as over $300\times10^4$ it becomes difficult to synthesize the graft copolymer under economical conditions and, even if the synthesis is possible, the resultant graft copolymer is liable to have an excessively large melt viscosity, and the melt-extrudability thereof is remarkably lowered. This is also impractical.

Regarding the ratios of the resin components, the composition according to the present invention comprises 50–97 wt. %, preferably 60–90 wt. %, of the polycarbonate resin and 3–50 wt. %, preferably 10–40 wt. %, Of the graft copolymer so as to maintain a good balance among mechanical performances, thermal properties, extrudability and thermoforming characteristic.

If the graft copolymer content is below 3 wt. % the resultant composition may have good mechanical performances but is caused to show a large drawdown during thermoforming and an inferior deep drawing characteristic, so that it becomes difficult to obtain a molded product with excellent size accuracy and only an insufficient improvement in thermoforming characteristic can be attained.

On the other hand, if the graft copolymer content exceeds 50 wt. %, the improvement in anti-drawdown characteristic or deep drawability is not increased as expected from the addition amount, but the resultant composition is liable to cause remarkably lowered rigidity and heat resistance, so that it becomes difficult to the inherent performances of the polycarbonate resin.

The components constituting the composition of the present invention may be performed in a conventional manner. For example, in a preferred method, the polycarbonate resin and the graft copolymer, respectively in the form of pellets or powder, may be uniformly blended with each other by cold blending using a Henschel mixer, a tumbler mixer, etc., and the resultant formulation may be kneaded under heating by a roll kneader, an extruder, etc., to provide the composition in the form of pellets.

The polycarbonate resin composition according to the present invention can further contain optional additives, such as thermal stabilizer, ultraviolet absorber, lubricant, antistatic agent, flame retardant, colorant, and inorganic or organic filler, as conventionally used in a polycarbonate resin.

The polycarbonate resin composition according to the present invention may be formed into molded products in the form of films, sheets, plates, etc., by ordinary molding or forming means, as used in molding of thermoplastic resin, particularly those used for melt-extrusion of an ordinary polycarbonate resin.

The sheet or plate-form product thus may be subjected to a thermoforming method, such as vacuum forming, air-pressure forming, or press molding.

EXAMPLES

Hereinbelow, the present invention will be described more specifically with reference to Examples and Comparative Examples. It should be noted however that the present invention is not limited to such Examples. In the description appearing hereinafter, the terms "%" and "parts" mean "% by weight (wt. %)" and "parts by weight (wt. parts)", respectively, unless otherwise noted specifically.

Further, components used for polymerization are indicated in amounts as a pure product even when they were actually used in a diluted state, unless otherwise noted specifically. The properties and performances of the products obtained in Examples and Comparative Examples were evaluated in the following manner.

Resin components constituting sample compositions

1) Polycarbonate (PC) resin

A-1: "NOVALEX 7027A" (trade name), mfd. by Mitsubishi Kasei K.K., Viscosity-average molecular weight= $2.7\times10^4$ A-2: "LEXAN 103–112" (trade name), mfd. by General Electric Co., Viscosity-average molecular weight= $2.6\times10^4$ 2) Graft copolymer Respectively indicated in Table 1.

Molecular weight of graft component 20 mg of a sufficiently dried graft copolymer sample was weighed and placed in a 30 ml-glass vessel, and 10 ml of tetrahydrofuran (THF) for gel permeation chromatography (GPC) was added thereto, followed by stirring for 3 hours at room temperature to dissolve the graft component. Then, the resultant THF solution was subjected to centrifugation at 20,000 rpm for 60 min. by a centrifugal separator ("85P-72", mfd. by Hitachi Kohki K.K.), and the resultant supernatant was filtrated by a disposable filter ("25N" (trade name) for non-aqueous sample, mfd. by Shimadzu Seisakusho K.K.). The filtrate was subjected to GPC to measure a weight-average molecular weight calibrated as corresponding to polystyrene. The GPC conditions were as follows.

Apparatus: "GPC System LC-6A", mfd. by Shimazu Seisakusho K.K.

Column: "Shim-pack GPC-80M", two columns.

THF flow rate: 1 ml/min.

Sample volume: 40 μl.

Extrudability

1) Flow characteristic

The flow state of a melted sample at a T-die outlet of an extruder was evaluated by observation with eyes.

o: A stable flow state free from extrusion irregularity over a full width of the extruded sheet.

x: Noticeable extrusion irregularity and unstable flow state.

2) Sheet appearance

A sheet product produced by extrusion through a T-die was evaluated by observation with eyes.

o: Free from irregularities, such as exfoliation, foaming, decomposition, scorching and surface roughening.

x: Accompanied with irregularities, such as exfoliation, foaming, decomposition, scorching and surface roughening.

Sheet performances

Test pieces were sampled from a sheet product in a flow direction (MD) and a transverse direction (TD) thereof and evaluated with respect to the following items except that test pieces for evaluation of yellowing were sampled in only one direction.

1) Izod strength: Measured according to ASTM D256 (with V-notch, at 23° C.).

2) Flexural modulus: Measured according to ASTM D790 (at 23° C.).

3) Heat distortion temperature: Measured according to ASTM D648 (load: 18.6 kg.f/cm$^2$).

4) Yellowing: Measured according to JIS Z-8722 (using a standard white plate).

Thermoforming characteristic of sheet

1) Drawdown

A 3 mm-thick sheet preliminarily dried under heating at 120° C. for 24 hours was fixed horizontally by sandwiching between an upper frame and a lower frame respectively having an inner size of 360 mm× 360 mm and heated by heaters from both sides at a temperature-raising rate of ca. 160° C./min. Then, when the sheet surface temperature reached 220° C., the degree of sag at a portion of the largest sag (almost the central part within the frame) was measured as a length from the frame face plane to the largest sag portion (positional lowering).

2) Deep drawing characteristic

A 3 mm-thick sheet preliminarily dried under heating at 120° C. for 24 hours was heated by heaters from both sides and, at a surface temperature of 150 ° C., subjected to vacuum forming by using a cylindrical mold having an inner diameter of 300 mm and a depth of 450 mm. The resultant formed product having a projecting portion with a bowl-shaped head was subjected to measurement of depths of the cylindrical part and the bowl-shaped head to obtain the surface area of the formed body by a calculation with the assumption that the bowl-shaped part had a shape of a partial sphere. The surface area was then divided by the original sheet area in the inner diameter of 300 mm (i.e., 706.5 cm$^2$) to obtain a magnification (a ratio of enlargement in surface area).

Example 1

Synthesis of graft copolymer (B-1)

The following ingredients were charged in a polymerization vessel and stirred in a nitrogen atmosphere to cause a reaction at 60° C. for 16 hours, thereby obtaining a rubber latex. The polymerization yield was almost 100%, and the rubber particle diameter was 100 nm.

| | |
|---|---|
| Deionized water | 233 part(s) |
| Sodium alkyldiphenyl-ether-disulfonate | 0.5 part(s) |
| Sodium pyrophosphate | 0.172 part(s) |
| Sodium iron ethylenediamine-tetraacetate (tri-hydrate) | 0.00363 part(s) |
| Sodium formaldehyde-sulfoxylate | 0.05 part(s) |
| Diisopropylbenzene hydroperoxide | 0.1 part(s) |
| 2-Ethylhexylacrylate | 77 part(s) |
| Butadiene | 23 part(s) |

Then, the following ingredients including a portion of the above rubber latex were charged in a polymerization vessel and, after aeration with nitrogen of the upper space, stirred to initiate graft-polymerization at 60° C.

| | |
|---|---|
| The above rubber latex (as solid) | 10 part(s) |
| Deionized water | 233 part(s) |
| Sodium alkyldiphenyl-ether-disulfonate | 0.9 part(s) |
| Sodium pyrophosphate | 0.045 part(s) |
| Sodium iron ethylenediamine-tetraacetate (tri-hydrate) | 0.0036 part(s) |
| Sodium formaldehyde-sulfoxylate | 0.025 part(s) |
| Diisopropylbenzene hydroperoxide | 0.08 part(s) |
| Styrene | 60 part(s) |
| Acrylonitrile | 20 part(s) |

From a time after 1.5 hours from the initiation of the polymerization, a liquid mixture of 10 parts of methyl acrylate and 0.05 part of diisopropylbenzene hydroperoxide was added in a period of 1.5 hours. In parallel with the addition of the liquid mixture, 1.35 parts of a 5%-aqueous solution of sodium formaldehyde-sulfoxylate was added in 6 hours.

After the complete addition of the sodium formaldehyde-sulfoxylate aqueous solution, the reaction was continued for further 30 min. to obtain a graft copolymer latex.

The polymerization conversion of the styrene and acrylonitrile at the time of the methyl acrylate addition was 87%, and the final polymerization conversion of the graft-polymerized components was almost 100%.

Then, 0.5 part each of a phenol-type stabilizer and a phosphorus-type stabilizer were added to the graft copolymer latex, followed by salting-out, de-watering and drying, to obtain a graft copolymer (B-1) in a powder form. The weight-average molecular weight of the graft component was 170×10$^4$.

26 parts of the graft copolymer (B-1) and 74 parts of an aromatic polycarbonate (A-1) ("NOVALEX 7027A", mfd. by Mitsubishi Kasei K.K.) were uniformly blended by a Henschel mixer and melt-kneaded at a melt resin temperature of 250° C. by a twin-screw kneading extruder ("PCM45", mfd. by Ikegai Tekko K.K.) to be extruded into pellets. The pellets were then dried for 4 hours at 120° C. and then extruded through a 50 mm-dia. single-screw extruder equipped with a T-die and a vent to be molded into a sheet of 3 mm in thickness and 60 mm in width.

The composition of the graft copolymer and the molecular weight of the graft-polymerized component thereof constituting the polycarbonate resin composition are shown in Table 1, and the extrudability and the performances including the thermoforming characteristic of the resultant sheet are inclusively shown in Table 2, respectively appearing hereinafter. As is clear from Table 2, the composition of Example 1 showed excellent extrudability, impact strength of the molded product and thermoforming characteristic of the sheet. Further, the sheet product showed very little difference according to sample-taking directions (i.e., MD or TD), thus showing a remarkably smaller anisotropy.

Example 2

The following ingredients including the same rubber latex as used for production of the graft copolymer (B-1) in Example 1 were charged in a polymerization vessel and stirred in a nitrogen atmosphere to effect graft-polymerization for 17 hours at 50° C.

| Rubber latex (rubber component of B-1 as solid) | 10 part(s) |
|---|---|
| Deionized water | 210 part(s) |
| Sodium alkyldiphenyl-ether-sulfoxylate | 0.9 part(s) |
| Potassium persulfate | 0.0225 part(s) |
| Styrene | 67.5 part(s) |
| Acrylonitrile | 22.5 part(s) |

The polymerization conversion of the graft component was almost 100%. The resultant graft copolymer latex was post-treated in the same manner as in Example 1 to obtain a graft copolymer (B-2) in a powder form. The weight-average molecular weight of the graft component was 250× $10^4$.

The graft copolymer (B-2) was blended with the polycarbonate resin (A-1) in a ratio shown in Table 2, and the resultant composition was evaluated with respect to the extrudability and performances of the molded product including thermoforming characteristic in the same manner as in Example 1. The results are shown in Table 2.

Examples 3–5 and Comparative Examples 1–2

Graft copolymer latexes having graft components of different molecular weights were prepared by using the following ingredients including the same rubber latex as used for production of the graft copolymer (B-1) in Example 1, and different amounts of chain transfer agent, i.e., 0 part (Example 3), 0.009 part (Example 4), 0.045 part (Example 5), 0.27 part (Comparative Example 1) and 1.5 parts (Comparative Example 2), respectively, of n-octylmercaptan.

| Rubber latex (rubber component of B-1 as solid) | 10 part(s) |
|---|---|
| Deionized water | 210 part(s) |
| Sodium alkyldiphenyl-ether-disulfonate | 0.9 part(s) |
| Sodium pyrophosphate | 0.9 part(s) |
| Sodium iron ethylenediamine-tetraacetate (tri-hydrate) | 0.0032 part(s) |
| Sodium formaldehyde-sulfoxylate | 0.09 part(s) |
| Diisopropylbenzene hydroperoxide | 0.09 part(s) |
| Styrene | 67.5 part(s) |
| Acrylonitrile | 22.5 part(s) |

In each Example, all the ingredients were charged in a polymerization vessel and stirred in a nitrogen atmosphere to effect graft copolymer for 15 hours at 50° C. to obtain a graft copolymer latex.

The polymerization conversion of the graft component of each graft copolymer was almost 100%. The resultant graft copolymer latexes were post-treated in the same manner as in Example 1 to obtain graft copolymers (B-3) to (B-7). The compositions and the weight-average molecular weights of the graft-components thereof are shown in Table 1.

Each of the graft copolymers and the polycarbonate resin (A-1) were blended in a ratio shown in Table 2, and the resultant composition was evaluated with respect to the extrudability and performances of the molded product including the thermoforming characteristic in the same manner as in Example 1. The results are also shown in Table 2.

From Table 2 in parallel with Table 1, it is understood that the polycarbonate resin compositions containing graft components having weight-average molecular weights within the specified range of the present invention provided sheet products showing a smaller anisotropy of impact strength and an excellent thermoforming characteristic.

Example 6

The following ingredients including the same rubber latex as used for production of the graft copolymer (B-1) in Example 1 were charged in a polymerization vessel and stirred in a nitrogen atmosphere to effect graft-polymerization for 15 hours at 60° C.

| Rubber latex (rubber component of B-1 as solid) | 10 part(s) |
|---|---|
| Deionized water | 222 part(s) |
| Sodium alkyldiphenyl-ether-disulfonate | 0.45 part(s) |
| Sodium pyrophosphate | 0.045 part(s) |
| Sodium iron ethylenediamine-tetraacetate (tri-hydrate) | 0.0032 part(s) |
| Sodium formaldehyde-sulfoxylate | 0.045 part(s) |
| Diisopropylbenzene hydroperoxide | 0.09 part(s) |
| Methyl methacrylate | 90 part(s) |

The polymerization conversion of the methyl methacrylate was almost 100%. The resultant graft copolymer latex was post-treated in the same manner as in Example 1 to obtain a graft copolymer (B-8) in a powder form. The composition of the graft copolymer and the weight-average molecular weight of the graft component are shown in Table 1.

The graft copolymer (B-8) was blended with the polycarbonate resin (A-1), and the resultant composition was evaluated with respect to the extrudability and performances of the molded product including thermoforming characteristic in the same manner as in Example 1. The results are shown in Table 3.

From the results shown in Table 3, it is understood that the composition obtained by using methyl methacrylate as the grafting monomer also showed excellent extrudability and provided a sheet product having excellent thermoforming characteristic and with little anisotropy in strength.

Example 7

The following ingredients including a polybutadiene straight rubber latex (solid matter content= 32.5%, average rubber particle diameter= 210 nm) were charged in a polymerization vessel and subjected to graft-polymerization at 60° C. for 7 hours under stirring in a nitrogen atmosphere to obtain a graft copolymer. The polymerization conversion of the graft component was almost 100%.

| Polybutadiene rubber latex (as solid) | 10 part(s) |
|---|---|

-continued

| Deionized water | 207 part(s) |
|---|---|
| Sodium alkyldiphenyl-ether-disulfonate | 0.45 part(s) |
| Sodium pyrophosphate | 0.045 part(s) |
| Sodium iron ethylenediamine-tetraacetate (tri-hydrate) | 0.0033 part(s) |
| Sodium formaldehyde-sulfoxylate | 0.045 part(s) |
| Diisopropylbenzene hydroperoxide | 0.09 part(s) |
| Styrene | 67.5 part(s) |
| Acrylonitrile | 22.5 part(s) |

The resultant graft copolymer latex was post-treated in the same manner as in Example 1 to obtain a graft copolymer (B-9) in a powder form. The composition of the graft copolymer and the weight-average molecular weight of the graft component are shown in Table 1.

The graft copolymer (B-9) was blended with the polycarbonate resin (A-1), and the resultant composition was evaluated with respect to the extrudability and performances of the molded product including thermoforming characteristic in the same manner as in Example 1. The results are shown in Table 3.

Comparative Example 3

The following ingredients including a polybutadiene straight rubber latex (solid matter content= 30%, average rubber particle diameter= 100 nm) were charged in a polymerization vessel and subjected to graft-polymerization at 70° C. for 6 hours under stirring in a nitrogen atmosphere to obtain a graft copolymer. The polymerization conversion of the graft component was ca. 97%.

| Polybutadiene rubber latex (as solid) | 30 part(s) |
|---|---|
| Deionized water | 160 part(s) |
| Hydrogenated disprotionated rosin acid sodium ester | 2 part(s) |
| Sodium alkylnaphthalene sulfonate | 0.15 part(s) |
| Sodium pyrophosphate | 0.5 part(s) |
| Sodium hydroxide | 0.15 part(s) |
| D-glucose | 1.0 part(s) |
| Ferrous sulfate (hepta-hydrate) | 0.01 part(s) |
| Cumene hydroperoxide | 0.75 part(s) |
| Styrene | 45 part(s) |
| Acrylonitrile | 25 part(s) |

The resultant graft copolymer latex was post-treated in the same manner as in Example 1 to obtain a graft copolymer (B-10) in a powder form. The composition of the graft copolymer and weight-average molecular weight of the graft component are shown in Table 1. The graft copolymer (B-10) was blended with the polycarbonate resin (A-1), and the resultant composition was evaluated with respect to the extrudability and performances of the molded product including thermoforming characteristic in the same manner as in Example 1. The results are shown in Table 3.

Table 3 shows that the composition provided a sheet product showing a large anisotropy in impact strength similarly as those of Comparative Examples 1 and 2.

Example 8

A polycarbonate resin composition was prepared in the same manner as in Example 1 except that the polycarbonate resin (A-1) was replaced by a polycarbonate resin (A-2) ("LEXAN 103–112", mfd. by General Electric Co.). The resultant composition was evaluated with respect to the extrudability and performances of the molded product including the thermoforming characteristic in the same manner as in Example 1. The results are also shown in Table 3.

Examples 9–12 and Comparative Examples 4–5

Polycarbonate resin compositions were prepared and evaluated in the same manner as in Example 1 except that the polycarbonate resin (A-I) and the graft copolymer (B-1) were blended in different ratios as shown in Table 4.

As is clear from Table 4, the polycarbonate resin compositions of the present invention showed an excellent extrudability, and provided sheet products showing excellent thermoforming characteristic as well as excellent mechanical and thermal properties.

Effect of the Invention

As described above, according to the present invention, there are provided a polycarbonate resin composition wherein a graft copolymer having a specific composition and including a graft component having a specific weight-average molecular weight is combined with a polycarbonate resin, and a molded product of the polycarbonate resin composition. As a result, the polycarbonate resin composition has excellent melt-extrudability and provides a molded product such as a sheet product showing excellent thermoforming characteristics, such as suppressed drawdown characteristic and good deep drawability at the time of thermoforming, without impairing the impact resistance, rigidity and the heat resistance inherently owned by the polycarbonate resin. Further, the molded product shows little anisotropy of mechanical property or heat resistance. Thus, the polycarbonate resin composition shows an extremely good balance between the processability thereof and the performances of the molded product.

TABLE 1

| | Composition and Characteristic Values of Graft Copolymer (G.C.) | | | | | | | |
|---|---|---|---|---|---|---|---|---|
| Graft copolymer | Rubber component (parts) | | Graft component | | | | Mol. wt. ($\times 10^4$) | Ex. and Comp. Ex. used |
| | 2-EHA | BD | Amounts (parts) | | | | | |
| | | | ST | AN | MA | MMA | | |
| B-1 | 7.7 | 2.3 | 60 | 20 | 10 | | 170 | Ex. 1, 8–12, etc. |
| B-2 | 7.7 | 2.3 | 67.5 | 22.5 | — | — | 250 | Ex. 2 |
| B-3 | 7.7 | 2.3 | 67.5 | 22.5 | — | — | 150 | Ex. 3 |
| B-4 | 7.7 | 2.3 | 67.5 | 22.5 | — | — | 100 | Ex. 4 |
| B-5 | 7.7 | 2.3 | 67.5 | 22.5 | — | — | 70 | Ex. 5 |
| B-6 | 7.7 | 2.3 | 67.5 | 22.5 | — | — | 36 | Comp. Ex. 1 |

TABLE 1-continued

| | Composition and Characteristic Values of Graft Copolymer (G.C.) | | | | | | |
|---|---|---|---|---|---|---|---|
| | Rubber component (parts) | | Graft component | | | | Ex. and |
| Graft | | | Amounts (parts) | | | Mol. wt. | Comp. Ex. |
| copolymer | 2-EHA | BD | ST | AN | MA | MMA | ($\times 10^4$) | used |
| B-7 | 7.7 | 2.3 | 67.5 | 22.5 | — | — | 20 | Comp. Ex. 2 |
| B-8 | 7.7 | 2.3 | — | — | — | 90 | 82 | Ex. 6 |
| B-9 | — | 10 | 67.5 | 22.5 | — | — | 80 | Ex. 7 |
| B-10 | — | 30 | 45 | 25 | — | — | 31 | Comp. Ex. 3 |

2-EHA: 2-ethylhexyl acrylate
BD: butadiene
AN: acrylonitrole
ST: styrene
MA: methyl acrylate
MMA: methyl methacrylate

TABLE 2

| | Resin Composition and Performances | | | | | | |
|---|---|---|---|---|---|---|---|
| | Example | | | | | Comp. Example | |
| | 1 | 2 | 3 | 4 | 5 | 1 | 2 |
| Resin Composition | | | | | | | |
| PC (A) | A-1 | A-1 | A-1 | A-1 | A-1 | A-1 | A-1 |
| G.C. (B) | B-1 | B-2 | B-3 | B-4 | B-5 | B-6 | B-7 |
| A/B (parts/parts) | 74/26 | 74/26 | 74/26 | 74/26 | 74/26 | 74/26 | 74/26 |
| Extrudability | o | o | o | o | o | o | o |
| Sheet appearance | o | o | o | o | o | o | o |
| Sheet thermoforming characteristics | | | | | | | |
| Drawdown (mm) | 70 | 60 | 72 | 77 | 83 | 130 | 142 |
| Deep drawability (times) | 3.1 | 3.9 | 3.0 | 2.8 | 2.6 | 2.0 | 1.9 |
| Izod strength (kgf · cm/cm) | | | | | | | |
| MD | 77 | 60 | 63 | 65 | 70 | 74 | 75 |
| TD | 74 | 63 | 65 | 64 | 58 | 35 | 25 |
| Yellowing | 8.4 | 11.0 | 10.6 | 10.6 | 10.5 | — | — |

TABLE 3

| | Resin Composition and Performances | | | |
|---|---|---|---|---|
| | Example | | | Comp. Ex. |
| | 6 | 7 | 8 | 3 |
| Resin Composition | | | | |
| PC (A) | A-1 | A-1 | A-2 | A-1 |
| G.C. (B) | B-8 | B-9 | B-1 | B-10 |
| A/B (parts/parts) | 74/26 | 74/26 | 74/26 | 74/26 |
| Extrudability | o | o | o | o |
| Sheet appearance | o | o | o | x |
| Sheet thermoforming characteristics | | | | |
| Drawdown (mm) | 80 | 83 | 75 | 60 |
| Deep drawability (times) | 2.7 | 2.9 | 3.0 | 2.6 |
| Izod strength (kgf · cm/cm) | | | | |
| MD | 53 | 67 | 58 | 56 |
| TD | 54 | 67 | 55 | 30 |

TABLE 4

| | Resin Composition and Performances | | | | | |
|---|---|---|---|---|---|---|
| | Example | | | | Comp. Example | |
| | 9 | 10 | 11 | 12 | 4 | 5 |
| Resin Composition | | | | | | |
| PC (A) | A-1 | A-1 | A-1 | A-1 | A-1 | A-1 |
| G.C. (B) | B-1 | B-1 | B-1 | B-1 | | B-1 |
| A/B (parts/parts) | 95/5 | 80/20 | 67/33 | 50/50 | 100/0 | 30/70 |
| Extrudability | o | o | o | o | o | o |
| Sheet appearance | o | o | o | o | o | x |
| Sheet thermoforming characteristics | | | | | | |
| Drawdown (mm) | 95 | 74 | 60 | 55 | 185 | 57 |
| Deep drawability (times) | 2.1 | 2.4 | 3.3 | 3.6 | 1.5 | 3.9 |
| Izod strength (kgf · cm/cm) | | | | | | |
| MD | 83 | 79 | 76 | 30 | 89 | 10 |
| TD | 80 | 75 | 68 | 20 | 85 | 8 |
| Flexural modulus ($\times 10^4$ kgf/cm$^2$) | | | | | | |
| MD | 2.65 | 2.74 | 2.82 | 2.94 | 2.63 | 3.25 |
| TD | 2.64 | 2.69 | 2.78 | 2.92 | 2.63 | 3.18 |
| Heat distortion temp. (°C.) | | | | | | |
| MD | 139 | 132 | 127 | 115 | 140 | 102 |
| TD | 137 | 130 | 120 | 108 | 138 | 95 |

What is claimed is:

1. A polycarbonate resin composition, comprising:

(A) 97–50 wt. % of a polycarbonate resin, and (B) 3–50 wt. % of a graft copolymer obtained by graft-polymerizing 50–95 wt. parts of a monomer selected from (b1) a monomer mixture comprising 60–90 wt. % of an aromatic vinyl monomer, 40–10 wt. % of a vinyl cyanide monomer, and 0–30 wt. % of a monomer copolymerizable with the monomers and (b2) an alkyl methacrylate having an alkyl group including 1–4 carbon atoms, in the presence of a latex containing 5–50 wt. parts of a rubber polymer with respect to the total of the monomer and the rubber polymer as 100 wt. parts, the graft copolymer including a graft-polymerized component having a weight-average molecular weight of $50 \times 10^4$–$300 \times 10^4$.

2. A polycarbonate resin composition according to claim 1, wherein the monomer mixture (b1) comprises styrene as the aromatic vinyl monomer, acrylonitrile as the vinyl cyanide monomer, and methyl acrylate as the monomer copolymerizable with the aromatic vinyl monomer and the vinyl cyanide monomer.

3. A polycarbonate resin composition according to claim 1, wherein the graft copolymer has been obtained by a graft-polymerization wherein a monomer mixture comprising 65–85 wt. % of styrene and 35–15 wt. % of acrylonitrile is polymerized to a polymerization conversion in the range of 75–95%, then methyl acrylate in an amount of 3–15 wt. % of the monomer mixture is added thereto, and the graft-polymerization is continued.

4. A polycarbonate resin composition according to claim 1, comprising:

(A) 90–60 wt. % of the polycarbonate resin, and (B) 10–40 wt. % of the graft copolymer obtained by graft-polymerizing 60–93 wt. parts of the monomer in the presence of the latex containing 7–40 wt. parts of the rubber polymer.

5. A polycarbonate resin composition according to claim 1, wherein the rubber polymer is a diene-based rubber polymer formed by polymerizing at least 50 wt. % of a conjugated diene monomer together with 0– 50 wt. % of a vinyl monomer copolymerizable therewith.

6. A polycarbonate resin composition according to claim 1, wherein the rubber polymer is an acrylic rubber polymer formed by polymerizing at least 50 wt. % of $c_1$–C12 alkyl acrylate together with a vinyl monomer copolymerizable therewith.

7. A polycarbonate resin composition according to claim 1, wherein the graft-polymerized component of the graft copolymer has a weight-average molecular weight of $100 \times 10^4$–$300 \times 10^4$.

8. A polycarbonate resin molded product, comprising a molded product of a polycarbonate resin composition according to any one of claims 1–7.

9. A polycarbonate resin molded product according to claim 8, comprising a sheet product obtained by extrusion of the polycarbonate resin composition.

10. A polycarbonate resin molded product according to claim 9, obtained by subjecting the sheet product to thermoforming.

* * * * *